United States Patent
Vasseur et al.

(10) Patent No.: US 7,512,063 B2
(45) Date of Patent: *Mar. 31, 2009

(54) BORDER ROUTER PROTECTION WITH BACKUP TUNNEL STITCHING IN A COMPUTER NETWORK

(75) Inventors: Jean-Philippe Vasseur, Dunstable, MA (US); Stefano B. Previdi, Rome (IT)

(73) Assignee: Cisco Technology, Inc., San Jose, CA (US)

(*) Notice: Subject to any disclaimer, the term of this patent is extended or adjusted under 35 U.S.C. 154(b) by 704 days.

This patent is subject to a terminal disclaimer.

(21) Appl. No.: 11/012,044

(22) Filed: Dec. 14, 2004

(65) Prior Publication Data

US 2006/0153067 A1    Jul. 13, 2006

(51) Int. Cl.
*H04J 3/14* (2006.01)
(52) U.S. Cl. .................... 370/217; 370/395.52
(58) Field of Classification Search ................ 370/217, 370/216; 709/223, 238
See application file for complete search history.

(56) References Cited

U.S. PATENT DOCUMENTS

| | | | |
|---|---|---|---|
| 6,628,649 B1 | 9/2003 | Raj et al. | |
| 6,751,190 B1 | 6/2004 | Swallow | |
| 6,778,492 B2 | 8/2004 | Charny et al. | |
| 6,831,898 B1 | 12/2004 | Edsall et al. | |
| 7,080,157 B2* | 7/2006 | McCanne | 709/238 |
| 7,143,420 B2* | 11/2006 | Radhakrishnan | 719/328 |
| 2003/0088529 A1* | 5/2003 | Klinker et al. | 706/3 |
| 2003/0126287 A1 | 7/2003 | Charny et al. | |
| 2003/0233595 A1 | 12/2003 | Charny et al. | |
| 2004/0090913 A1 | 5/2004 | Scudder et al. | |
| 2004/0196827 A1 | 10/2004 | Xu et al. | |
| 2004/0223497 A1* | 11/2004 | Sanderson et al. | 370/395.52 |
| 2005/0111351 A1* | 5/2005 | Shen | 370/217 |
| 2005/0120242 A1* | 6/2005 | Mayer et al. | 713/201 |
| 2006/0114916 A1* | 6/2006 | Vasseur et al. | 370/397 |

(Continued)

OTHER PUBLICATIONS

Rekhter, Y., RFC 1771, entitled A Border Gateway Protocol 4 (BGP-4), Mar. 1995, pp. 1-54.

(Continued)

*Primary Examiner*—Thong H Vu
(74) *Attorney, Agent, or Firm*—Cesari and McKenna LLP

(57) ABSTRACT

A technique protects against the failure of a border router between two domains in a computer network using Fast Reroute and backup tunnels. According to the technique, the protected border router advertises a list of all its adjacent next-hop routers (i.e., its "neighbors"). A neighbor in the first domain that is immediately upstream to the protected border router and that is configured to protect the border router (i.e., the "protecting router") selects a neighbor in a second domain (i.e., a "next-next-hop," NNHOP) to act as a "merge point" of all the NNHOPs of that domain. The protecting router calculates a backup tunnel to the merge point that excludes the protected border router and associates the backup tunnel with all "protected prefixes." The merge point then "stitches" additional backup tunnels onto the backup tunnel to provide a stitched tunnel to each remaining NNHOP. When the protected border router fails, Fast Reroute is triggered, and all protected prefix traffic is rerouted onto the backup tunnel to the merge point, which either forwards the traffic to its reachable prefixes or to a corresponding stitched tunnel.

26 Claims, 8 Drawing Sheets

U.S. PATENT DOCUMENTS

| | | | |
|---|---|---|---|
| 2006/0117110 A1* | 6/2006 | Vasseur et al. | 709/232 |
| 2006/0126496 A1* | 6/2006 | Filsfils et al. | 370/216 |
| 2007/0011284 A1* | 1/2007 | Le Roux et al. | 709/223 |

OTHER PUBLICATIONS

U.S. Appl. No. 10/767,574, filed Sep. 18, 2003, Vasseur et al., entitled Computing Inter-Autonomous System MPLS Traffic Engineering LSP Paths.

U.S. Appl. No. 11/001,349, filed Dec. 1, 2004, Vasseur et al., entitled Propagation of Routing Information in RSVP-TE for Inter-Domain TE-LSPS.

U.S. Appl. No. 11/011,814, filed Dec. 14, 2004, Vasseur et al., entitled an Efficient Mechanism for Fast Recovery IUN Case of Border Router Node Failure in a Computer Network.

Perlman, Radia, Interconnections Second Edition: Bridges, Routers, Switches, and Internetworking Protocols, Addison Wesley, 1999.

Pan et al., Fast Reroute Extensions to RSVP-TE for LSP Tunnels (draft-ietf-mpls-rsvp-lsp-fastreroute-07.txt), Internet Draft, Feb. 2005 pp. 1-35.

Vasseur, J.P. et al., RSVP Path Computation Request and Reply Messages (draft-vasseur-mpls-computation-rsvp-05.txt), Internet Draft, Jul. 2004, pp. 1-31.

Callon, R., RFC 1195, entitled Use of OSI ISIS for routing in TCP/IP and Dual Environments, Dec. 1990, pp. 1-80.

Rekhter, Y., RFC 1771, entitled A Border Gateway Protocol 4 (BGP-4), Mar. 1995, pp. 1-28.

Braden, R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Coltun, R., RFC 2370, entitled The OSPF Opaque LSA Option, Jul. 1998, pp. 1-13.

Awduche, D. et al., RFC 3209, entitled RSVP-TE: Extensions to RSVP for LSP Tunnels Dec. 2001, pp. 1-43.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

* cited by examiner

BORDER ROUTER PROTECTION WITH BACKUP TUNNEL STITCHING IN A COMPUTER NETWORK

RELATED APPLICATION

This application is related to U.S. application Ser. No. 11/011,814, entitled AN EFFICIENT MECHANISM FOR FAST RECOVERY IN CASE OF BORDER ROUTER NODE FAILURE IN A COMPUTER NETWORK, filed by Vasseur et al. on even date herewith, the contents of which are hereby incorporated in its entirety.

BACKGROUND OF THE INVENTION

1. Field of the Invention

The present invention relates to computer networks and more particularly to protecting against border router failure between domains of a computer network using backup tunnels.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or, more particularly, an area is generally referred to as a "domain," and a router that interconnects different domains together is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next-hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4* (BGP-4), published March 1995.

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI ISIS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address (e.g., stored in a header of the packet) may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement. Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes. Then, each of the IGP nodes can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modem label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, availability of backup bypass tunnels for each link and node included in the path, etc. Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., IGP area or level, or may also span multiple domains, e.g., IGP areas or levels.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will have sufficient knowledge to compute a path. Because of this, MPLS Traffic Engineering path computation techniques are required to compute inter-domain TE-LSPs.

The use of PCEs has been adapted to create a distributed PCE architecture, in order to extend MPLS TE-LSPs across domain boundaries. An example of such a distributed architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Reconfiguring a network in response to a network element failure using, e.g., pure IP rerouting, can be time consuming. Many recovery techniques, however, are available to provide fast recovery and/or network configuration in the event of a network element failure, including, inter alia, Fast Reroute (FRR), e.g., IP FRR or MPLS TE FRR. An example of MPLS TE FRR is described in Pan, et al., *Fast Reroute Extensions to RSVP-TE for LSP Tunnels*, Internet Draft, February 2005, which is hereby incorporated by reference as though fully set forth herein. FRR has been widely deployed to protect against intra-domain network failures, where "backup tunnels" are created to bypass a protected network device (e.g., links, shared risk link groups (SRLGs), and nodes). When the network element fails, traffic is quickly rerouted over a backup tunnel to bypass the failed device (or in the case of MPLS, a set of TE-LSP(s) is/are quickly rerouted). In an interdomain IP/MPLS environment, however, there is a lack of knowledge of routers surrounding an inter-domain border router regarding the forwarding path of inter-domain traffic traversing that border router. Protection of border routers is particularly critical because of the amount of traffic generally traversing them. While solutions are available to create inter-domain backup tunnels (e.g., manually configuring backup tunnels from each router surrounding the border router in one domain to each router surrounding the border router in another), one difficulty is to dynamically select an appropriate backup tunnel for each destination address prefix. Selecting an improper backup tunnel could result in routing loops, black holing, time delay, or other undesirable outcomes.

SUMMARY OF THE INVENTION

The present invention is directed to a technique for protecting traffic (IP) against the failure of a border router between two domains in a computer network using Fast Reroute and backup tunnels. According to the protection technique, the border router (i.e., the "protected border router") announces/advertises a list of all its adjacent next-hop routers (i.e., its "neighbors") residing in first and second domains interconnected by the protected border router. A neighbor in the first domain that is immediately upstream to the protected border router and that is configured to protect the border router (i.e., the "protecting router") selects a neighbor in a second domain (a "next-next-hop," NNHOP) to act as a "merge point" of all the NNHOPs of that domain. The protecting router calculates a backup tunnel to the merge point that excludes the protected border router, and associates the backup tunnel with all prefixes originally bound for the protected border router ("protected prefixes"). The merge point further calculates additional backup tunnels to the remaining NNHOPs in its domain and associates each additional backup tunnel with one or more protected prefixes accordingly. The merge point then "stitches" these additional backup tunnels to the end of the backup tunnel to thereby provide a stitched tunnel to each remaining NNHOP. When the protected border router fails, Fast Reroute is triggered, and all protected prefix traffic is rerouted by the protecting router onto the backup tunnel to the merge point, which either forwards the traffic to its reachable prefixes or to a corresponding stitched tunnel.

In the illustrative embodiment of the present invention, the protected border router employs an Interior Gateway Protocol (IGP), such as the Open Shortest Path First (OSPF) or Intermediate-System-to-Intermediate-System (IS-IS) protocol, to transmit the advertised list of neighbors. Notably, a specific type of IGP advertisement may be used to limit the transmission to only the neighbors. In one aspect of the present invention, extensions to IGP may also advertise attributes (e.g., cost, bandwidth, etc.) related to the link between the protected border router and each of its neighbors. Alternatively, the protecting router creates a Multiprotocol Label Switching (MPLS) Traffic Engineering Label Switched Path (TE-LSP) to each NNHOP, and utilizes extensions to a request/response signaling exchange, such as the Resource ReSerVation Protocol (RSVP), to learn the link attributes. These TE-LSPs are "fake," in that they are only used to obtain the attribute information, (e.g., without reserving bandwidth), and may be subsequently torn down.

Upon receiving the list of neighbors, the protecting router parses those NNHOP neighbors that are in the second domain, and selects one of those NNHOPs to be the merge point at the "tail-end" of the backup tunnel. The merge point can be selected based on the link attributes (e.g., highest bandwidth), or randomly, such as in the case where link attributes are not known. The calculated backup tunnel to the merge point is diversely routed around the protected border router (e.g., by traversing another border router between the first and second domains). This backup tunnel is illustratively stored in a first shadow table of the protecting router, so that conventional (IP) routing may still be performed by the protecting router using to its routing table.

The merge point determines that is a merge point for a particular border router, e.g., through RSVP TE signaling extensions when the backup tunnel is created. The merge point then uses the advertised list of neighbors from the protected border router to compute the stitched tunnels to each NNHOP in its domain. The merge point also computes a shortest path tree (SPT) rooted at the protected border router to learn address prefixes that are reachable from the border router, as well as next-hops used to reach those prefixes. These learned prefixes and next-hops are stored in a second shadow table (at the merge point) that is maintained current in the event of protected border router failure.

Once the protecting router determines that the protected border router has failed, Fast Reroute is triggered, and all traffic destined to the protected prefixes is rerouted by the protecting router onto a backup tunnel to the merge point, e.g., according to its first shadow table. The merge point then determines whether any entry in its second shadow table corresponds to the destination address prefix of the rerouted traffic. If there is an entry (e.g., when a flag or pointer in the merge point's routing table indicates such), the traffic is routed onto the appropriate stitched tunnel. If there is no entry available for a given address prefix, the traffic is routed in a conventional manner from the merge point (e.g., when the merge point itself is the next-hop of the protected border router, in steady state, for the address prefix). Notably, because all traffic is initially rerouted to the merge point, which subsequently determines the proper routing of the traffic, no address reachability information (other than next-hops) is required to be sent from the protected border router to the protecting router.

Advantageously, the novel technique protects against the failure of a border router between two domains in a computer network using Fast Reroute and backup tunnels. By creating a backup tunnel between a protecting router and a merge point, and stitching tunnels from the merge point to next-hop routers, the inventive technique provides Fast Reroute protection of the border router that requires minimal configuration and avoids the deployment of backup tunnels from every neighbor in the first domain of the protected border router to every neighbor in the second domain.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
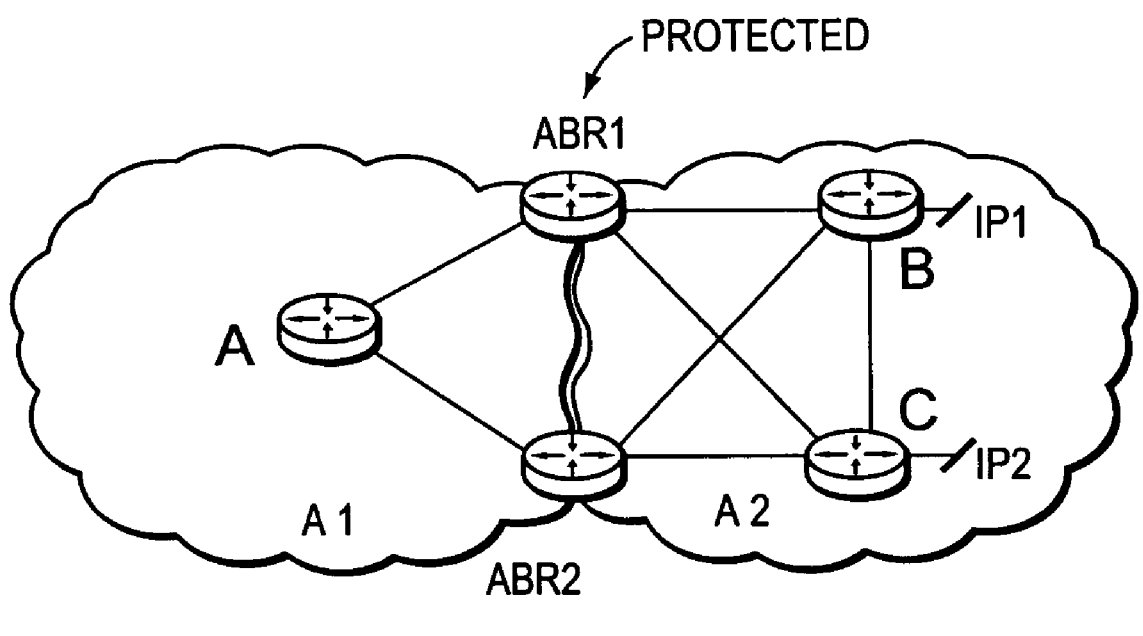
FIG. 1 is a schematic block diagram of an exemplary computer network of areas that may be used in accordance with the present invention.

FIG. 1 is a schematic block diagram of an exemplary computer network 100 comprising area A1 having exemplary intradomain router A, and area A2 having exemplary intradomain routers B and C. Illustratively, address prefixes IP1 and IP2 are reachable via routers B and C, respectively. In addition, A1 and A2 share area border routers ABR1 and ABR2. As used herein, an area is a collection of routers that share full network topology information with each other but not necessarily with routers outside the area. A collection of areas may be contained within a single autonomous system (AS). The term area as used herein also encompasses the term "level" which has a similar meaning for networks that employ IS-IS as their interior gateway protocol (IGP), in which case the area border routers ABR1-2 are embodied as level 1/level 2 (L1L2) routers. These examples are merely representative. The terms area and level are used interchangeably herein, as well as the use of ABR, L1L2 routers, and more generally, border routers.

Data packets may be exchanged among the areas A1-A2 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the areas using predetermined IGPs, such as conventional distance-vector protocols or, illustratively, link-state protocols, through the use of link-state advertisements or link-state packets ("IGP Advertisements").

Figure 2:
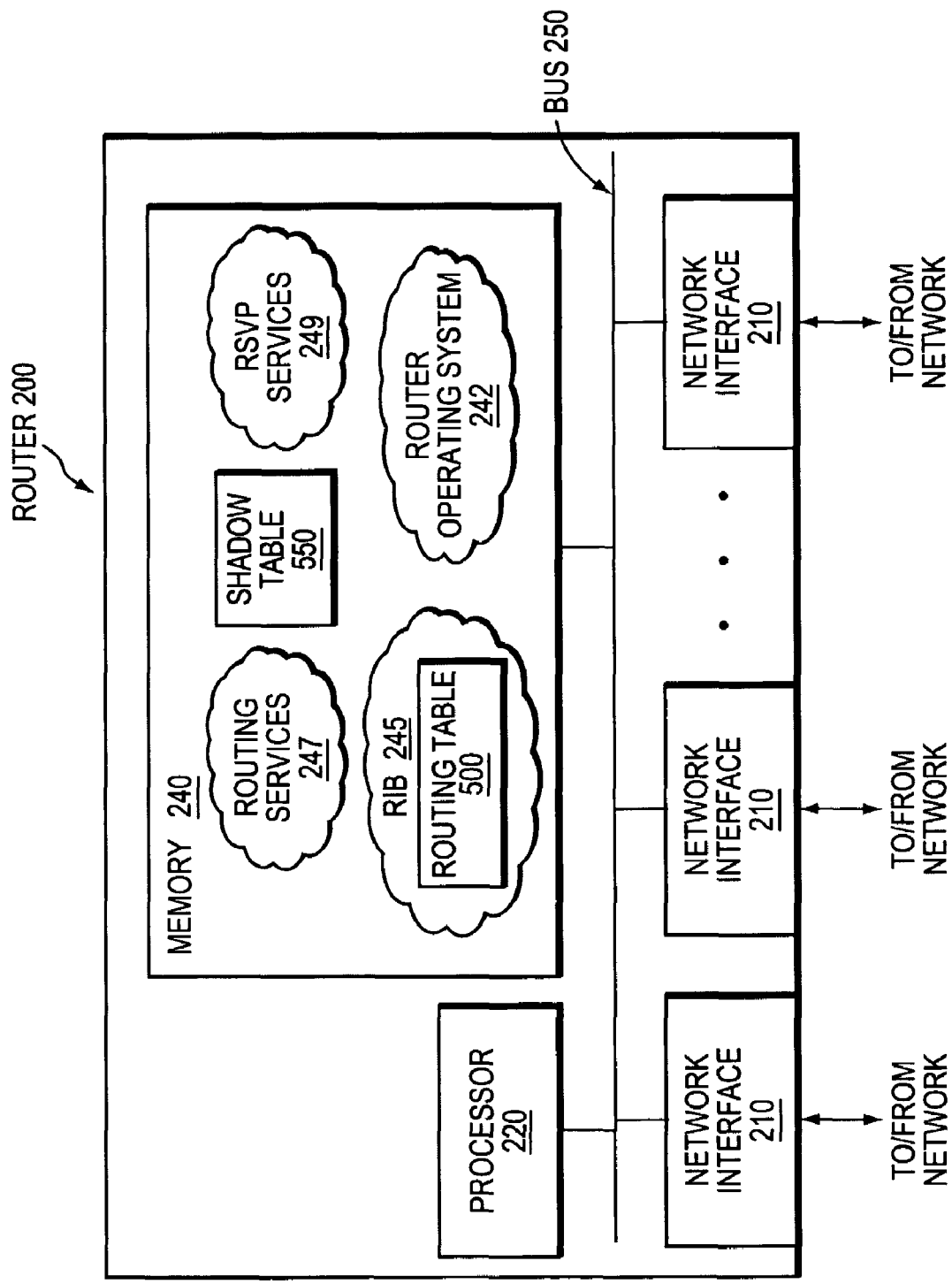
FIG. 2 is schematic block diagram of an exemplary router that may be advantageously used with the present invention.

FIG. 2 is a schematic block diagram of an exemplary router 200 that may be advantageously used with the present invention as, e.g., an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 500 and shadow table 550. A router operating system 242, portions of which are typically resident in memory 240 and executed by the processor, functionally organizes the router by, inter alia, invoking network operations in support of software processes and/or services executing on the router. These software processes and/or services include Routing Information Base (RIB) 245, routing services 247, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF and IS-IS. These functions may be configured to manage a forwarding information data-base (not shown) containing, e.g., data used to make forwarding decisions. RSVP services 249 contain computer executable instructions for implementing RSVP and processing RSVP messages in accordance with the present invention. RSVP is described in R. Braden, et al., *Resource ReSerVation Protocol (RSVP)*, Request For Comments (RFC) 2205, September 1997, available from the IETF and which is hereby incorporated by reference as though fully set forth herein, and in RFC 3209, entitled *RSVP-TE: Extensions to RSVP for LSP Tunnels*, as incorporated above.

Changes in the network topology may be communicated among routers 200 using a link-state protocol, such as the conventional OSPF and IS-IS protocols. Suppose, for example, that a communication link fails within an area or a cost value associated with a network node changes. Once the change in the network's state is detected by one of the routers, that router may flood an IGP Advertisement communicating the change to the other routers in the area. In this manner, each of the routers eventually "converges" to an identical view of the network topology.

In one embodiment, the routers described herein are IP routers that implement Multi-Protocol Label Switching (MPLS) and operate as label switched routers (LSRs). In one simple MPLS scenario, at an ingress to a network, a label is assigned to each imcoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs). Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol, and in particular, RSVP TE signaling messages.

In accordance with RSVP, to establish a TE-LSP (data flow) between a sender (e.g., a head-end node A) and a receiver (e.g., a tail-end node C), the sender may send an RSVP path (Path) message downstream hop-by-hop along a path (e.g., a unicast route) to the receiver to identify the sender and indicate e.g., bandwidth needed to accommodate the data flow, along with other attributes of the TE-LSP. The Path message may contain various information about the data flow including, e.g., traffic characteristics of the data flow.

To compute paths across multiple domains, previously incorporated U.S. application Ser. No. 10/767,574 describes the use of a virtual shortest path tree (VSPT) algorithm in a distributed path computation element (PCE) architecture. Notably, it will be apparent to those skilled in the art that other methods may be used to compute the TE-LSPs (e.g., explicit paths, etc.), and such methods are within the scope of the present invention. Furthermore, the path computation request (and response) can be implemented in accordance with a protocol specified in Vasseur, et al. *RSVP Path Computation Request and Reply Messages* (*draft-vasseur-mpls-computation-rsvp-05.txt*), Internet Draft, July 2004, which is hereby incorporated by reference as though fully set forth herein.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present invention is directed to a technique for protecting traffic (IP) against the failure of a border router between two domains in a computer network using Fast Re-route and backup tunnels. According to the protection technique, the border router (i.e., the "protected border router") announces/advertises a list of all its adjacent next-hop routers (i.e., its "neighbors") residing in first and second domains interconnected by the protected border router. A neighbor in the first domain that is immediately upstream to the protected border router and that is configured to protect the border router (i.e., the "protecting router") selects a neighbor in a second domain (a "next-next-hop," NNHOP) to act as a "merge point" of all the NNHOPs of that domain. The protecting router calculates a backup tunnel to the merge point that excludes the protected border router, and associates the backup tunnel with all prefixes originally bound for the protected border router ("protected prefixes"). The merge point further calculates additional backup tunnels to the remaining NNHOPs in its domain and associates each additional backup tunnel with one or more protected prefixes accordingly. The merge point then "stitches" these additional backup tunnels to the end of the backup tunnel to thereby provide a stitched tunnel to each remaining NNHOP. When the protected border router fails, Fast Reroute is triggered, and all protected prefix traffic is rerouted by the protecting router onto the backup tunnel to the merge point, which either forwards the traffic to its reachable prefixes or to a corresponding stitched tunnel.

In the illustrative embodiment of the present invention, the protected border router employs an Interior Gateway Protocol (IGP), such as the Open Shortest Path First (OSPF) or Intermediate-System-to-Intermediate-System (IS-IS) protocol, to transmit the advertised list of neighbors. Notably, a specific type of IGP advertisement may be used to limit the transmission to only the neighbors. In one aspect of the present invention, extensions to IGP may also advertise attributes (e.g., cost, bandwidth, etc.) related to the link between the protected border router and each of its neighbors.

Figure 3:
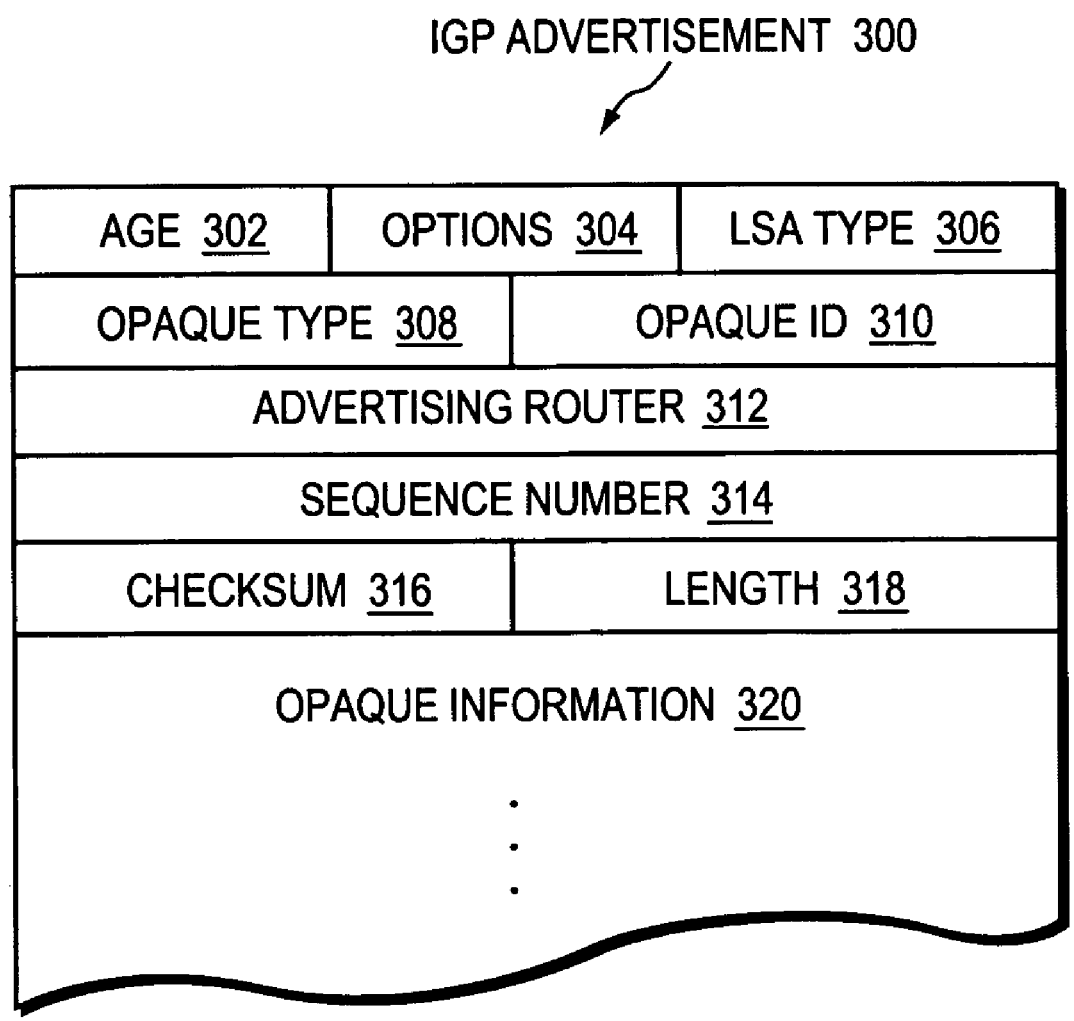
FIG. 3 is a schematic block diagram of an exemplary IGP Advertisement that may be flooded by the routers.

FIG. 3 illustrates an exemplary IGP Advertisement 300 that may be transmitted (flooded) by the router 200 (e.g., the protected border router). Illustratively, the IGP Advertisement 300 is embodied as a Type-9 Opaque LSA, defined in RFC 2370, entitled *The OSPF Opaque LSA Option*, dated July 1998, the contents of which are hereby incorporated by reference in its entirety. An Age field 302 stores an age value that may be used for determining whether the IGP Advertisement 300 is valid. The age value is typically initialized to a non-zero integer value, often in units of seconds. The age value may be decremented, e.g., by one every second, until it reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until it reaches a known upper limit.

The advertisement 300 also includes an Options field 304, and an LSA Type field 306 denoting whether the LSA is a Type-9, Type-10, or Type-11 LSA. A Type-11 LSA has AS-wide scope, meaning it is flooded throughout an entire AS, while a Type-10 LSA has area-wide scope, which would not be flooded beyond that area into which the LSA was flooded. A Type-9 LSA, on the other hand, has a link-local scope, which is not flooded beyond the local (sub)network, i.e., only to the adjacent next-hop routers (neighbors). While the present invention illustratively utilizes a Type-9 LSA to limit unnecessary network traffic, those skilled in the art will understand that other LSA Types may be used with the scope of the present invention.

Also included within the IGP Advertisement 300 is an Opaque Type field 308 and an Opaque ID field 310, which signify the type and ID of the Opaque LSA. An Advertising Router field 312 stores a value that identifies the router that generated and originally broadcast the IGP Advertisement 300. A Sequence Number field 314 stores a sequence number indicating the relative version of the IGP Advertisement. Typically, the sequence number stored in the field 314 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The IGP Advertisement also includes a Checksum field 316 containing a checksum used to validate the contents of the Advertisement, and a Length field 318 containing a value used to signify either the overall length of the Advertisement or the length of an Opaque Information field 320. The Opaque Information field 320, by definition, is used by the advertising node for transmitting any desired information. According to the invention, the Opaque Information field illustratively includes a list of addresses for the next-hop neighbors adjacent to the protected border router. Using FIG. 1 as an example, the Opaque Information field populated by, e.g., protected border router ABR1, would contain the addresses of adjacent routers A, B, and C. In the event the IGP Advertisement is configured to advertised link attributes, or "metrics," (e.g., bandwidth, cost, etc.) of the NNHOPs, the Opaque Information field is also adapted to transmit that information as well.

Alternatively, the IGP Advertisement may be in the form of an IS-IS Link State Packet (not shown), which may include type/length/value (TLV) encoded formats to convey information. The TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields. In the alternative embodiment, the IS-IS Packet may include an Extended Object illustratively embodied as a TLV. The Value field of the Extended Object may contain, inter alia, a list of addresses for the next-hop neighbors adjacent to the protected border router, as mentioned above. Notably, however, an IS-IS Link State Packet is generally not limited in scope and is flooded throughout an entire IS-IS level, in which case the non-neighboring routers would be configured to ignore the list of addresses. Also notably, the list of NNHOPs, and/or their associated link attributes may be statically configured, e.g., by a system administrator with inter-domain knowledge of the network topology.

Upon receiving the list of neighbors, the protecting router (e.g., a "point of local repair," PLR) parses those NNHOP neighbors that are in the second domain. The protecting router parses the NNHOPs from the list of neighbor addresses by comparing the addresses to addresses already known to the protecting router to be in its domain through examination of, e.g., its shortest path tree (SPT). If the protecting router does not have an address listed as an address in its SPT, the address must be in another domain, and hence, an NNHOP reachable through the protected border router. Alternatively, the NNHOPs may be statically configured, e.g., by a system administrator with inter-domain knowledge. This alternative may be practical for use where a protected border router has only a small number of (e.g., two or three) NNHOPs in its surrounding areas.

As an alternative to the IGP Advertisement 300 above (once the protecting router parses out the NNHOPs), the protecting router creates MPLS TE-LSPs to the NNHOPs and utilizes extensions to a request/response signaling exchange, such as RSVP, to learn the link attributes. Each TE-LSP is illustratively embodied as an unconstrained two-hop TE-LSP from the protecting router (A) to each NNHOP (B and C) via the protected border router (ABR1). The TE-LSPs are created using any available tunnel establishment protocols, such as explicit path or PCE-based path computation. Also, because they are used only to retrieve link attribute information from the NNHOPs, the TE-LSPs may be configured as "fake" TE-LSPs, meaning they reserve no bandwidth and/or transmit no traffic.

Figure 4:
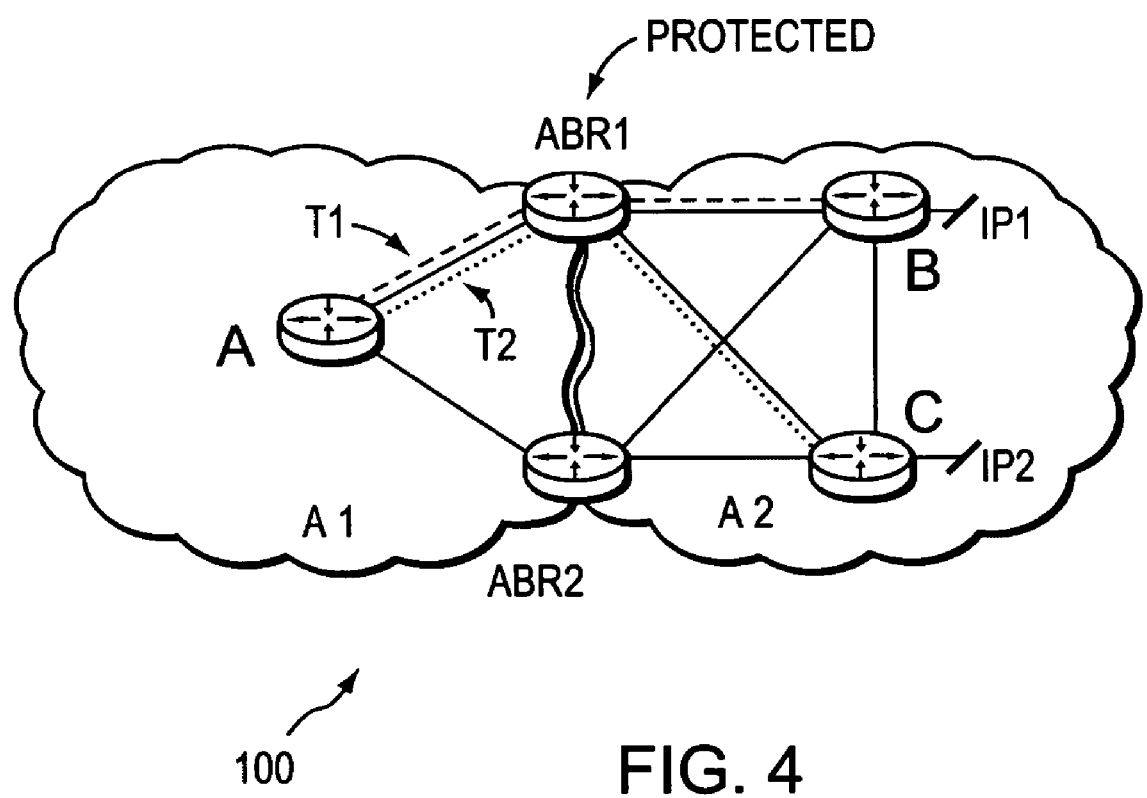
FIG. 4 is a schematic block diagram of an exemplary computer network as in FIG. 1 with illustrative TE-LSPs in accordance with the present invention.

FIG. 4 is a schematic block diagram of an exemplary computer network 100 as in FIG. 1 with illustrative TE-LSPs in accordance with the alternative mentioned above of the present invention. Notably, these TE-LSPs are created according to the methods described above. For example, T1 (shown as a dashed line) is a TE-LSP from head-end router A (protecting router) through ABR1 (protected border router) to tail-end router B (which can reach IP1). In addition, T2 (shown as a dotted line) is a TE-LSP from head-end router A through ABR1 to tail-end router C (which can reach IP2).

The protecting router selects one of the NNHOPs to be the merge point at the "tail-end" of the backup tunnel. The merge point can be selected based on the link attributes (e.g., highest bandwidth), or randomly, such as in the case where link attributes are not known. For example, if the protecting router (A) receives link attributes (e.g., bandwidth) from two NNHOPs (B and C) that are 2.5 GBps (Gigabits per second) for the first NNHOP (B) and 10 GBps for the second NNHOP (C), the protecting router (A) selects the second NNHOP (C) as the merge point. Notably, the metrics used to select a merge point should be representative of the merge point's ability to handle traffic and, to that end, other metrics (besides bandwidth) may be used for the selection of a merge point. In the event the selection metric is equivalent among multiple NNHOPs, a second metric may be used or an NNHOP may be randomly selected. Alternatively, the merge point may be selected by a system administrator and configured as such accordingly.

The calculated backup tunnel to the merge point is diversely routed around the protected border router (e.g., by traversing another border router between the first and second domains). The backup tunnel (or "branch backup tunnel") is illustratively embodied as any known tunnel type, such as, e.g., MPLS TE-LSPs, L2TP tunnels, PPTP tunnels, or IP tunnels. To assure that the tunnel is diversely routed from the protected border router, network element exclusion or PCE-based inter-domain path computation can be used. In FIGS. 1 and 4, a diverse backup tunnel manifests as traversing ABR2. It should be noted that any other border router (not shown) that is separate (diverse) from the protected border router may be used.

Figure 5:
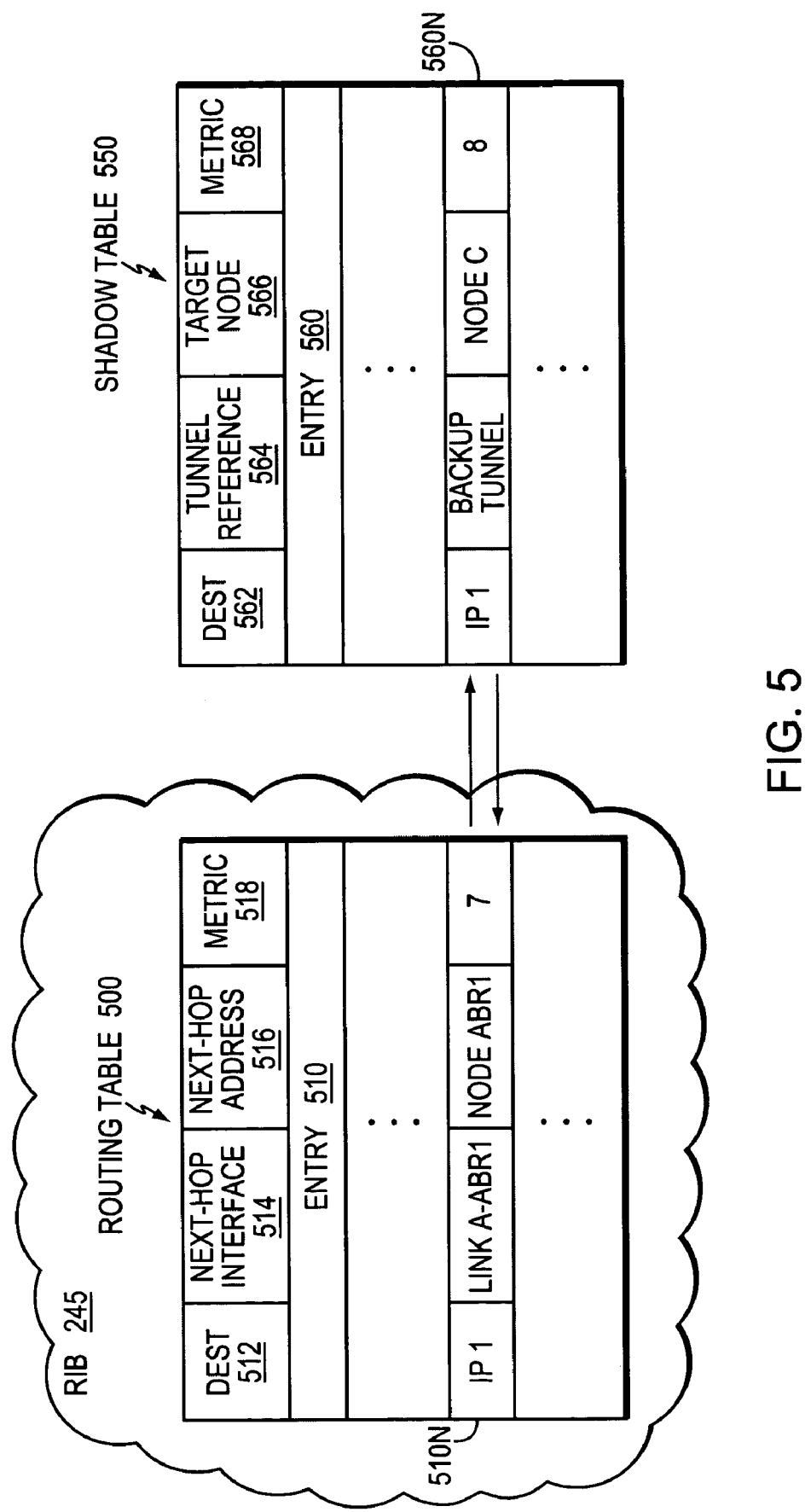
FIG. 5 is schematic block diagram of an exemplary routing table that may be advantageously used with the present invention.

The branch backup tunnel is illustratively stored in a first shadow table of the protecting router, so that conventional (IP) routing may still be performed by the protecting router using to its routing table. FIG. 5 is schematic block diagram of exemplary routing table 500 that may be advantageously used with the present invention. Routing table 500 is illustratively stored in memory 240 and includes one or more entries 510, each comprising a plurality of fields for storing a reachable destination address 512, a next-hop interface 514 and next-hop address 516 to reach that destination, and an associated metric (e.g., cost) 518 of reaching the destination. The routing table 500 is illustratively maintained and managed by RIB 245. To that end, the RIB 245 maintains copies of routes (paths) provided by the routing protocols, such as IGP, in order to compute best paths/routes for installation into the routing table 500.

For example, assume that a destination address prefix IP1 is reachable from node A via node B. In addition, the cost of the path A-B connecting node A to node B is "6" (such as via ABR1 of FIG. 1), and the cost of the link(s) from B to the reachable address IP1 is "1." A destination address field 512 of entry 510N contains the reachable address IP1, and the next-hop fields 514, 516, are populated with, e.g., link A-ABR1 and a loopback address of node ABR1, respectively. Note that a loopback address of the next hop node is used as the next-hop address for many reasons, including as a way to avoid depending upon the availability of network interfaces of that node. The cost of IP1 is the cost of all links to the reachable address, i.e., "7."

Associated with IP1 of entry 510N is first shadow table 550. As noted, the first shadow table 550 illustratively stores the backup tunnel created by the protecting router, such that conventional routing still occurs at the protecting router. Fields of the first shadow table 550 are populated with the information corresponding to the backup tunnel. The first shadow table 550 essentially comprises the same format as routing table 500, but with destination address prefixes reachable via the backup tunnel to the merge point, i.e., the protected prefixes originally destined through the protected border router. Illustratively, the protected prefixes are obtained by associating address prefixes having the protected border router as a next-hop in routing table 500 to the backup tunnel. Specifically, each entry 560 of the first shadow table 550 may include a plurality of fields for storing one or more destination prefixes 562 reachable via the backup tunnel, a reference to the backup tunnel 564 to the merge point, the address of the merge point 566, and (optionally) a cost metric 568, e.g., "8." Notably, the cost metric for the tunnel may be greater than, less than, or equal to the cost of the IP routing links, and that the values "8" and "7" respectively should be taken as examples. Note also that the cost along the protected path may or may not be known by the protecting router, in which case such cost would not be present in the shadow table 550.

Figure 6A:
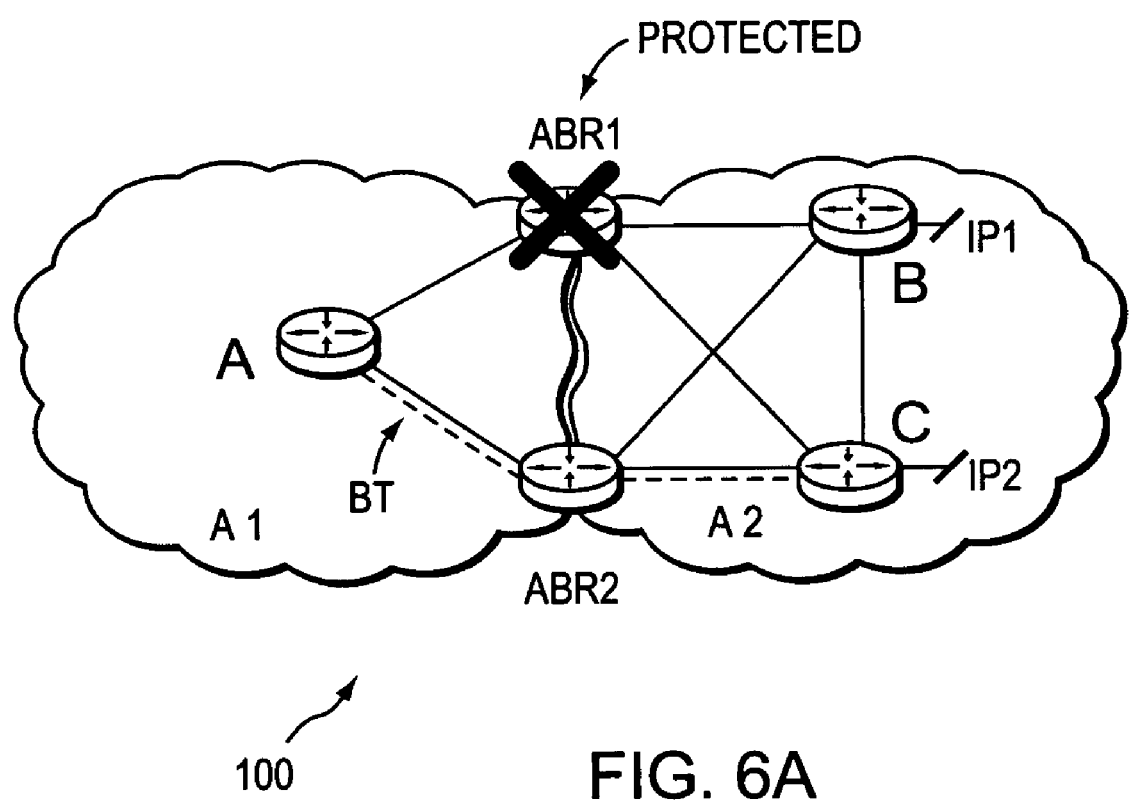
FIG. 6A is a schematic block diagram of an exemplary computer network as in FIG. 1 with an illustrative backup tunnel in accordance with the present invention.

FIG. 6A is a schematic block diagram of an exemplary computer network 100 as in FIG. 1 with an illustrative backup tunnel in accordance with the present invention. Notably, the backup tunnel is created according to the methods described above. For example, BT (shown as a dashed line) is a backup tunnel from head-end router A (protecting router) through ABR2 (diverse border router) to tail-end router C (merge point and which can reach IP2). Prior to any change in the state of ABR1 (prior to failure), conventional IP routing (using, e.g., routing table 500) is employed by RIB 245 of protecting router A (i.e., IP packets are IP routed, etc.). The backup tunnel stored in the first shadow table 550 is "dormant" (unused) until needed, as described below.

The merge point determines that is a merge point for a particular border router, e.g., through RSVP TE signaling extensions when the backup tunnel is created. For example a new flag may be added to an RSVP Path message (not shown). When the protecting router establishes the backup tunnel with the selected NNHOP, the RSVP TE signaling extensions notify the NNHOP that it is a merge point. The merge point then uses is the advertised list of neighbors from the protected border router to compute the stitched tunnels to each NNHOP in its domain. The stitched tunnels may be computed using explicit path or PCE-based computation, and stored in a second shadow table 550 (of the merge point) as described below. The stitched tunnels are illustratively embodied as any known tunnel type, such as, e.g., MPLS TE-LSPs, L2TP tunnels, PPTP tunnels, or IP tunnels.

The merge point also computes a shortest path tree (SPT) rooted at the protected border router to learn address prefixes that are reachable from the border router, as well as which next-hops are used by the protected border router to reach those prefixes. Specifically, the merge point (router C) performs a shortest path first (SPF) computation rooted at the protected border router to create the SPT. Here, the merge point (C) learns that it is protecting a particular border router (ABR1) through an extended signaling object of the RSVP Path message that contains the node-identification (node-id) of the border router. Description of extensions to RSVP signaling messages can be found in U.S. application Ser. No. 11/001,349, entitled PROPAGATION OF ROUTING INFORMATION IN RSVP-TE FOR INTER-DOMAIN TE-LSPS, filed by Vasseur et al. on Dec. 1, 2004, the contents of which are hereby incorporated in its entirety. The merge point traverses the SPT to locate a sub-branch starting at each NNHOP and tags all address prefixes downstream from the NNHOP (i.e., away from the protected border router) with a value corresponding to a loopback address of the NNHOP.

These learned (tagged) prefixes and appropriate next-hops are stored (in conjunction with the stitched tunnels described above) in a second shadow table that is created and maintained current by the merge point in the event of protected border router failure. The second shadow table is similar in format and function to the first shadow table 550 of the protecting router, except instead of pointing to the backup tunnel, entries 560 point to the corresponding stitched tunnels.

Figure 6B:
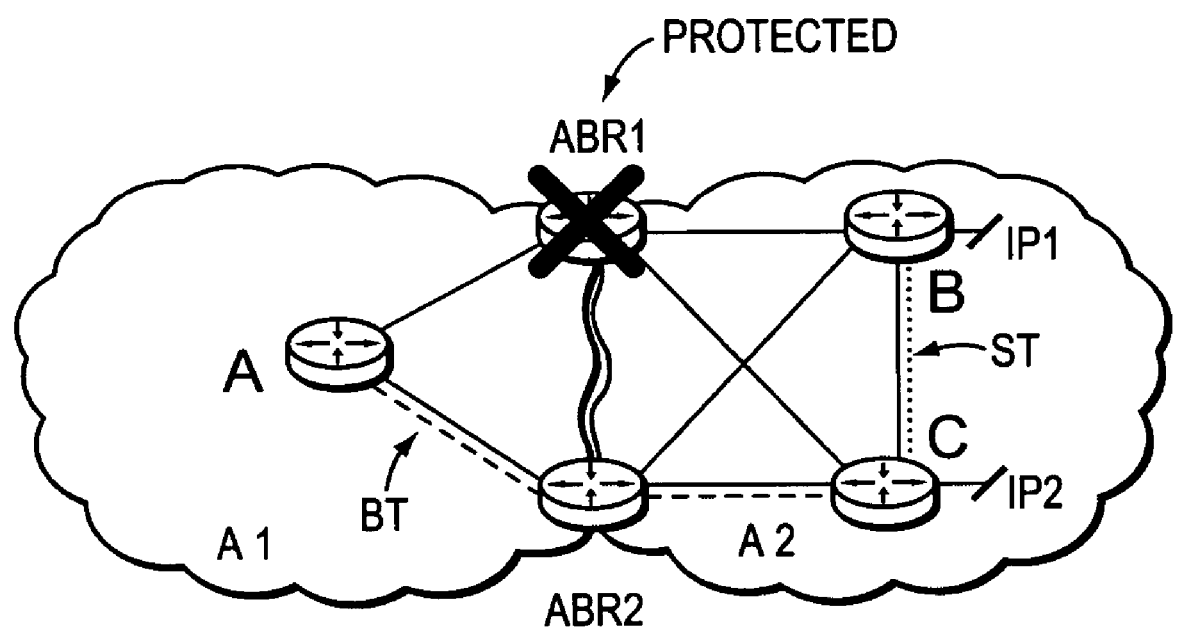
FIG. 6B is a schematic block diagram of an exemplary computer network as in FIG. 6A with an illustrative stitched tunnel in accordance with the present invention.

FIG. 6B is a schematic block diagram of an exemplary computer network 100 as in FIG. 6A with an illustrative stitched tunnel in accordance with the present invention. Notably, the stitched tunnel is created according to the methods described above. For example, ST (shown as a dotted line) is a stitched tunnel from head-end router C (merge point) to tail-end router B (which can reach IP1). Prior to any change in the state of ABR1 (prior to failure), conventional IP routing (e.g., using routing table 500) is employed by RIB 245 of merge point router C (i.e., IP packets are IP routed, etc.). The stitched tunnel stored in the second shadow table 550 is "dormant" (unused) until needed, as described below.

Once the protecting router determines that the protected border router has failed (e.g., as denoted by "X" overlaid on ABR1 in FIG. 6B), Fast Reroute is triggered, and all traffic destined to the protected prefixes is rerouted by the protecting router onto the branch backup tunnel to the merge point, e.g., according to its first shadow table. The protecting router detects a failure of the protected border router through any known link or node failure detection technique, such as layer 2 failure detection and/or any keep-alive protocol (e.g., IGP or Bidirectional Forwarding Detection, BFD), the latter of which detects, generally, the presence or absence of a connection signal or "heartbeat."

According to the invention, once Fast Reroute has been triggered, the RIB 245 adapts its routing policy to determine whether incoming traffic is destined for the set of protected prefixes (i.e., through the protected border router). Notably, this determination can be made by comparing the destination prefix to the protected prefixes or by comparing the next-hop address of the destination prefix to the protected border router address. Alternatively, upon receiving the traffic, the RIB 245 checks the corresponding routing table entry 510N for a respective shadow table entry 560N, such as through a flag, a pointer, or other indicating means. Should there be no indication of a respective shadow table entry (i.e., the traffic is not destined for a protected prefix), the routing table entry 510N is used in a conventional manner. If, however, the traffic is bound for a protected prefix (e.g., IP1), it is rerouted onto the backup tunnel in the respective shadow table entry 560N, such as in backup tunnel reference field 564 (backup tunnel) to the merge point (router C). Illustratively, a traffic packet (e.g., an IP packet) that is destined for a protected prefix is encapsulated as a tunnel packet (a tunnel label is appended or "pushed" onto the packet), which is rerouted onto the backup tunnel corresponding to the tunnel label (BT). Once the backup tunnel tail-end node (merge point C) receives the tunnel packet, it removes ("pops") the tunnel label, and routes the traffic packet according to the methods described below.

Alternatively, once Fast Reroute has been triggered, the RIB 245 merges the contents of a shadow table entry 560N with a respective routing table entry 510N when the reachable destination addresses match. As a result of the merge, the associated attributes of the routing table entry 510N are updated to reflect attributes of the backup tunnel. For example, the entry 510N of the routing table 500 is updated such that the next-hop interface field 514 contains the backup tunnel reference from entry 564, the next-hop address field 516 contains node C from field 566, and the metric field 518 (if necessary) contains the cost of the backup tunnel (e.g., the value "8") from field 568. It may be desirable, in this alternative embodiment, to store the previous information of the routing table entry 510N, such that in the event the protected border router becomes available, the traffic flow may be restored to its original state.

Upon receiving the rerouted traffic, the merge point determines whether any entry in its second shadow table corresponds to the destination address prefix of the rerouted traffic. If there is an entry (e.g., according to the same determinations used by the protecting border router mentioned above), the traffic is routed onto the appropriate stitched tunnel. If there is no entry available for a given address prefix, the traffic is routed in a conventional manner from the merge point (e.g., when the merge point itself is the next-hop of the protected border router, in steady state, for the address prefix). Notably, because all traffic is initially rerouted to the merge point, which subsequently determines the proper routing of the traffic, no address reachability information (other than next-hops) is required to be sent from the protected border router to the protecting router. Alternatively, the merge point may further distinguish between traffic received via the backup tunnel (to be forwarded in accordance with the present invention), or traffic received from elsewhere (to be forwarded based on conventional routing, regardless of destination prefix).

Figure 7:
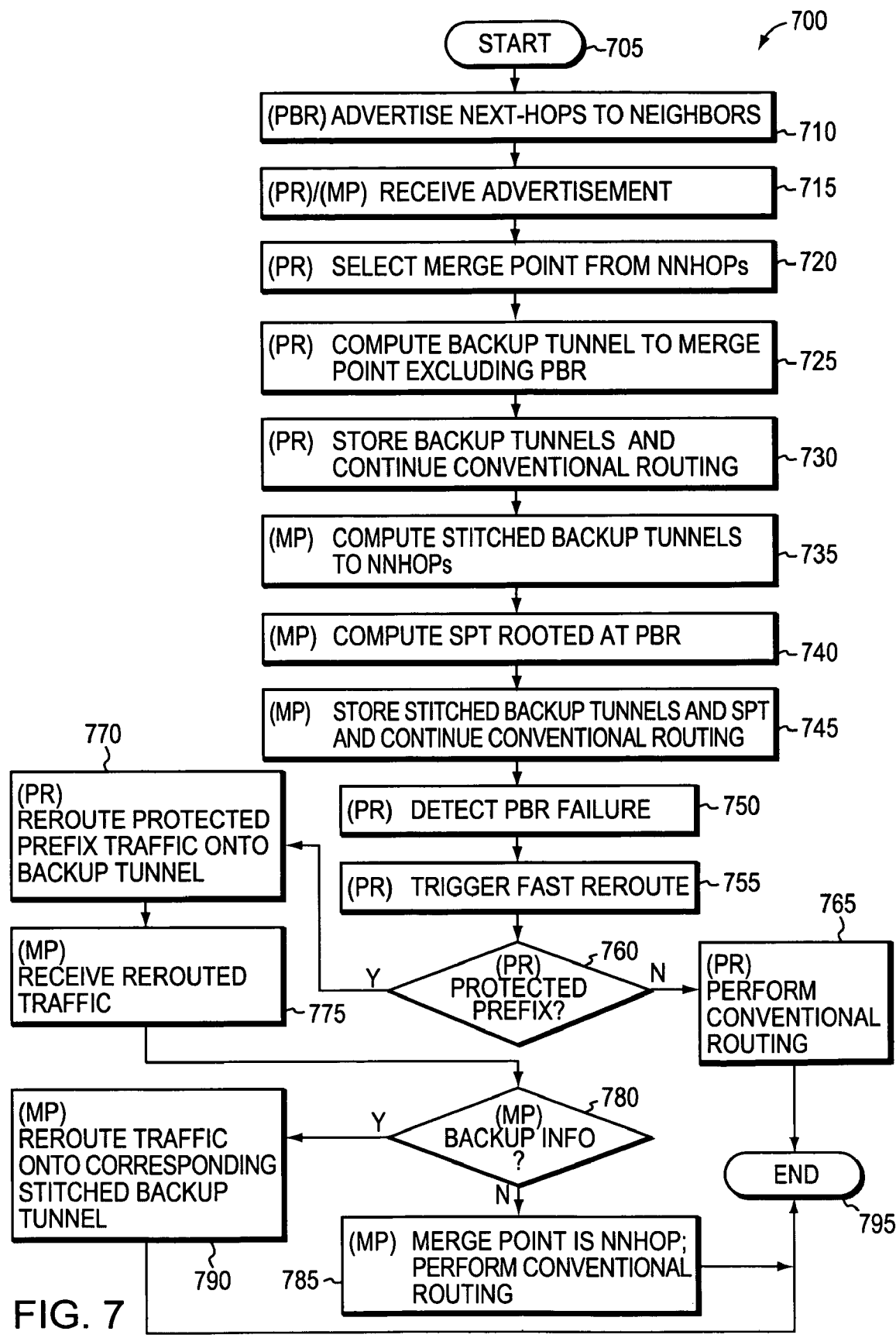
FIG. 7 is a flowchart illustrating a sequence of steps for protecting against the failure of a border router between two domains in accordance with the present invention.

FIG. 7 is a flowchart illustrating a sequence of steps for protecting against the failure of a border router between two domains in accordance with the present invention. The sequence 700 starts at step 705, and continues to step 710, where a protected border router (PBR) (ABR1) advertises a list of next-hop routers to its surrounding neighbors, such as, e.g., through an IGP Advertisement 300 as described above. Note that the IGP Advertisement illustratively contains extensions for advertising link attributes between the PBR and its neighbors. Upon receiving the advertisement in step 715, a protecting router (PR) configured as such (router A), illustratively selects a merge point (e.g., according to optimal link attributes or randomly) in step 720 (such as router C).

In step 725, the protecting router computes a backup tunnel to the merge point (such as backup tunnel BT to router C). To ensure diversity, the backup tunnel must specifically exclude the protected border router (ABR1), such as by network element exclusion or PCE-based inter-domain path computation as mentioned above. In step 730, the protecting router stores the backup tunnel (e.g., in first shadow table 550), and continues conventional routing (e.g., using routing table 500). Upon receiving notification that it is the tail-end of the backup tunnel, the merge point computes a stitched tunnel from itself to each of the NNHOPs in its domain in step 735. In step 740, the merge point computes an SPT rooted at the protected border router to learn which NNHOP would be used by the protected border router to reach certain protected prefixes. The merge point then stores the stitched tunnel(s) and the SPT information (e.g., in second shadow table similar to table 550) in step 745, and continues conventional routing.

In step 750, the protecting router detects a failure of the protected border router, and triggers Fast Reroute in step 755. In step 760, the protecting router then determines whether the traffic is destined for the protected prefixes. If not, the traffic is conventionally routed in step 765. Otherwise, all traffic destined for the protected prefixes (i.e., originally through the protected border router) is rerouted onto the backup tunnel (BT) in step 770, e.g., according to the first shadow table 550. Upon receiving the rerouted traffic in step 775, the merge point checks for backup information relating to the destination prefix (e.g., by checking for a flag or pointer) in step 780. If there is no backup information, the merge point determines that it is the NNHOP for the destination prefix, and conventionally routes the traffic in step 785. Otherwise, if there is backup information in step 780, the traffic is again rerouted (by the merge point) onto the corresponding stitched tunnel in step 790, e.g., according to the second shadow table 550. The sequence ends in step 795.

Advantageously, the novel technique protects against the failure of a border router between two domains in a computer network using Fast Reroute and backup tunnels. By creating a backup tunnel between a protecting router and a merge point, and stitching tunnels from the merge point to next-hop routers, the inventive technique provides Fast Reroute protection of the border router that requires minimal configuration and avoids the deployment of backup tunnels from every neighbor in the first domain of the protected border router to every neighbor in the second domain.

While there has been shown and described an illustrative embodiment that protects against the failure of a border router between two domains in a computer network, it is to be understood that various other adaptations and modifications may be made within the spirit and scope of the present invention. For example, the invention may also be advantageously used with ASes under applicable circumstances. Alternatively, through modifications to the teachings described herein and/or additional processing, those skilled in the art will understand that the present invention may be adapted for use with ASes generally.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for protecting against the failure of a border router between two domains in a computer network, the method comprising:

configuring a next-hop router in a first domain to protect the border router (protecting router);

selecting one or more next-hop routers in a second domain (NNHOPs) to be a merge point;

calculating a backup tunnel from the protecting router to the merge point that excludes the border router;

calculating one or more additional backup tunnels from the merge point to the remaining NNHOPs; and in response to failure of the border router,
  i) rerouting traffic bound to the border router onto the backup tunnel; and
  ii) forwarding rerouted traffic received on the backup tunnel and bound to address prefixes corresponding to NNHOPs onto corresponding additional tunnels.

2. The method as in claim 1, further comprising: advertising, from the border router, a list of the one or more adjacent next-hop routers residing in the first and second domains interconnected by the border router.

3. The method as in claim 2, further comprising: employing, at the border router, an Interior Gateway Protocol (IGP) to transmit the advertised list of next-hop routers.

4. The method as in claim 2, further comprising: specifying a type of advertisement to limit the transmission to only the next-hop routers.

5. The method as in claim 2, further comprising: advertising attributes related to a link between the border router and the NNHOPs.

6. The method as in claim 1, further comprising:
  creating, at the protecting router, Multiprotocol Label Switching (MPLS) Traffic Engineering Label Switched Paths (TE-LSPs) to each of the one or more NNHOPs; and
  utilizing extensions to a request/response signaling exchange to learn attributes related to a link between the border router and the NNHOPs.

7. The method as in claim 6, further comprising: creating TE-LSPs to learn attributes without reserving bandwidth.

8. The method as in claim 1, further comprising: selecting the merge point based on attributes related to a link between the border router and the NNHOPs.

9. The method as in claim 1, further comprising: selecting the merge point randomly.

10. The method as in claim 1, further comprising: storing the backup tunnel in a shadow table of the protecting router.

11. The method as in claim 1, further comprising:
  computing, at the merge point, a shortest path tree (SPT) rooted at the border router to learn address prefixes that are reachable from the border router; and
  associating NNHOPs with the learned address prefixes.

12. The method as in claim 1, further comprising: storing the one or more additional tunnels in a shadow table of the merge point.

13. A system for protecting against the failure of a border router between two domains in a computer network, the system comprising:
  one or more next-hop routers adjacent to the border router, the one or more adjacent next-hop routers residing in first and second domains interconnected by the border router, one next-hop router in the first domain configured to protect the border router (protecting router);
  a backup tunnel extending from the protecting router to one of the one or more next-hop routers in the second domain (NNHOPs) selected as a merge point, the backup tunnel excluding the border router and associated with address prefixes bound for the border router, where in response to failure of the border router, the address prefix traffic is rerouted onto the backup tunnel to the merge point; and
  one or more additional backup tunnels extending from the merge point to the one or more NNHOPs, the one or more additional backup tunnels associated with one or more address prefixes learned from the NNHOPs, where in response to failure of the border router the merge point forwards the rerouted address prefix traffic onto an appropriate additional backup tunnel to a corresponding NNHOP.

14. The system as in claim 13, wherein the border router is configured to create and send an advertisement to the next-hop routers, the advertisement containing a list of the one or more adjacent next-hop routers.

15. The system as in claim 14, wherein the advertisement employs an Interior Gateway Protocol (IGP) to transmit the advertised list of next-hop routers.

16. The system as in claim 14, further comprising: a specific type of advertisement to limit the transmission to only the next-hop routers.

17. The system as in claim 13, further comprising:
  Multiprotocol Label Switching (MPLS) Traffic Engineering Label Switched Paths (TE-LSPs) created at the protecting router to each of the one or more NNHOPs; and
  extensions to a request/response signaling exchange to learn the link attributes.

18. The system as in claim 17, wherein the TE-LSPs reserve no bandwidth.

19. The system as in claim 13, further comprising: a shadow table of the protecting router to store the backup tunnel.

20. The system as in claim 13, further comprising: a shadow table of the merge point to store the one or more additional backup tunnels.

21. An apparatus for protecting against the failure of a border router between two domains in a computer network, the apparatus comprising:
  means for configuring a next-hop router in a first domain to protect the border router (protecting router);
  means for selecting one or more next-hop routers in a second domain (NNHOPs) to be a merge point;
  means for calculating a backup tunnel from the protecting router to the merge point that excludes the border router;
  means for calculating one or more additional backup tunnels from the merge point to the remaining NNHOPs;
  means for rerouting traffic bound to the border router onto the backup tunnel in response to failure of the border router; and
  means for forwarding rerouted traffic received on the backup tunnel and bound to address prefixes corresponding to NNHOPs onto corresponding additional tunnels.

22. A computer readable medium containing executable program instructions for protecting against the failure of a border router between two domains in a computer network, the executable program instructions comprising program instructions for:
  configuring a next-hop router in a first domain to protect the border router (protecting router);
  selecting one or more next-hop routers in a second domain (NNHOPs) to be a merge point;
  calculating a backup tunnel from the protecting router to the merge point that excludes the border router;
  calculating one or more additional backup tunnels from the merge point to the remaining NNHOPs; and
  in response to failure of the border router,
    i) rerouting traffic bound to the border router onto the backup tunnel; and
    ii) forwarding rerouted traffic received on the backup tunnel and bound to address prefixes corresponding to NNHOPs onto corresponding additional tunnels.

23. An apparatus, comprising;
a network interface operable to terminate a backup tunnel originating at a router in a first domain (protecting router) that is located a next-hop away from a border router, the backup tunnel traversing a path from the protecting router to the apparatus that excludes the border router; and
a processor operable to calculate one or more additional backup tunnels from the apparatus to one or more next-hop routers from the border router that are in a second domain (NNHOPs), and to associate the backup tunnel with each of the one or more additional backup tunnels, the processor further operable to, in response to failure of the border router, receive rerouted traffic on the backup tunnel and forward the rerouted traffic received on the backup tunnel over the one or more additional backup tunnels to NNHOPs within the second domain.

24. The apparatus as in claim 23, further comprising:
a memory operable to store a shadow table including information descriptive of the one or more additional backup tunnels.

25. The apparatus as in claim 23, wherein the processor is further operable to compute a spanning tree rooted at the border route to learn address prefixes reachable from the boarder router and next-hops used to reach the reachable address prefixes.

26. The apparatus as in claim 23, further comprising:
a network interface operable to terminate a Multiprotocol Label Switching (MPLS) Traffic Engineering Label Switched Path (TE-LSP) from the protecting router, the MPLS TE-LSP to support a signaling exchange of link attributes.

* * * * *

UNITED STATES PATENT AND TRADEMARK OFFICE
CERTIFICATE OF CORRECTION

PATENT NO. : 7,512,063 B2 Page 1 of 1
APPLICATION NO. : 11/012044
DATED : March 31, 2009
INVENTOR(S) : Jean-Philippe Vasseur It is certified that error appears in the above-identified patent and that said Letters Patent is hereby corrected as shown below:

Col. 3, Line 57, please amend as shown:

MPLS Traffic Engineering exploits[[ modem]] modern label switching

Col. 8, Line 63, please amend as shown:

assigned to each[[ imcoming]] incoming packet based on its forwarding

Col. 13, Line 51, please amend as shown:

then uses[[ is]] the advertised list of neighbors from the protected

Signed and Sealed this

Twenty-eighth Day of September, 2010

David J. Kappos
*Director of the United States Patent and Trademark Office*